(12) United States Patent
Melly

(10) Patent No.: US 6,779,292 B1
(45) Date of Patent: Aug. 24, 2004

(54) LARGE MESH COMMERCIAL FISHING NETTING AND METHOD OF MANUFACTURE

(76) Inventor: James P. Melly, 5005 176 St., SE., Bothell, WA (US) 98108

( * ) Notice: Subject to any disclaimer, the term of this patent is extended or adjusted under 35 U.S.C. 154(b) by 0 days.

(21) Appl. No.: 10/280,636

(22) Filed: Oct. 28, 2002

(51) Int. Cl.$^7$ ................................................ A01K 73/06
(52) U.S. Cl. ............................................................ 43/8
(58) Field of Search .............................. 87/3, 4, 12, 53; 43/9.1, 9.95

(56) References Cited

U.S. PATENT DOCUMENTS

| | | | |
|---|---|---|---|
| 1,897,224 A | * | 2/1933 | Andrews ...................... 57/237 |
| 2,162,115 A | * | 6/1939 | Pauls ............................. 87/12 |
| 2,511,057 A | * | 6/1950 | Guthrie et al. ............... 43/9.95 |
| 2,816,386 A | * | 12/1957 | Harris et al. ................. 43/9.95 |
| 4,491,052 A | * | 1/1985 | Holm et al. ..................... 87/3 |
| 4,648,159 A | * | 3/1987 | Dougherty ................. 24/712.7 |
| 6,374,531 B1 | * | 4/2002 | Safwat et al. ................. 43/4.5 |

* cited by examiner

Primary Examiner—Peter M. Poon
Assistant Examiner—Bethany L. Griles
(74) Attorney, Agent, or Firm—John H. Crozier

(57) ABSTRACT

In a preferred embodiment, fishing netting, including: a plurality of meshes formed from straps of twine, each strap having loops formed at each end thereof and at the center thereof, each loop being secured by a mechanical fastener. A method of manufacturing the fishing netting is also provided.

5 Claims, 2 Drawing Sheets

US 6,779,292 B1

LARGE MESH COMMERCIAL FISHING NETTING AND METHOD OF MANUFACTURE

BACKGROUND OF THE INVENTION

1 Field of the Invention

The present invention relates to a fishing netting generally and, more particularly, but not by way of limitation, to novel large mesh fishing netting and a method of making the same.

2 Background Art

The non-machine made portion of conventional fishing netting for midwater trawling and similar types of fishing have mesh apexes that are knotted, usually by hand. Typically, twisted or braided twines are used, normally made from nylon. A major problem with such fishing netting is that the knots tend to slip and, therefore, the mesh size is not uniform.

Accordingly, it is a principal object of the present invention to provide novel fishing netting that does not employ knots.

It is a further object of the invention to provide such fishing netting that can be economically constructed.

It is an additional object of the invention to provide such fishing netting that can be easily repaired.

It is another object of the invention to provide such fishing netting that can be easily towed.

It is yet a further object of the invention to provide such fishing netting that is easily handled.

Other objects of the present invention, as well as particular features, elements, and advantages thereof, will be elucidated in, or be apparent from, the following description and the accompanying drawing figure.

SUMMARY OF THE INVENTION

The present invention achieves the above objects, among others, by providing, in a preferred embodiment, fishing netting, comprising: a plurality of meshes formed from straps of twine, each strap having loops formed at each end thereof and at the center thereof, each loop being secured by a mechanical fastener. A method of manufacturing said fishing netting is also provided.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
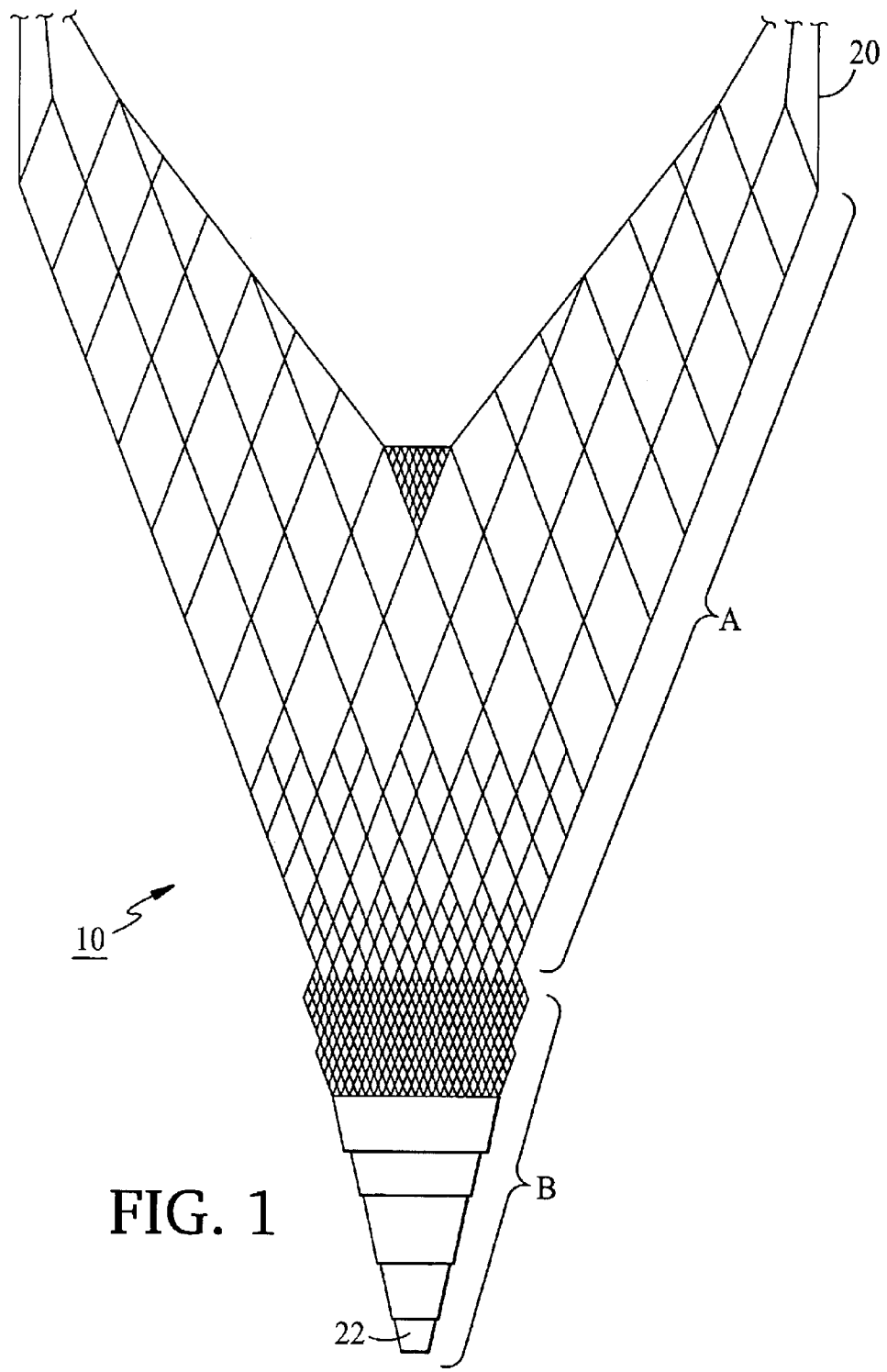
FIG. 1 is a top plan view of fishing netting with which the present invention may be used.

Reference should now be made to the drawing figures on which similar or identical elements are given consistent identifying numerals throughout the various figures thereof, and on which parenthetical references to figure numbers, when used, direct the reader to the view(s) on which the element(s) being described is (are) best seen, although the element(s) may be seen on other figures also.

FIG. 1 illustrates fishing netting, employing the present invention, and generally indicated by the reference numeral 10. It will be understood that fishing netting 10 is shown in a flattened state, however, when deployed in use, fishing netting would take a rounded or oval shape.

Fishing netting 10 comprises two sections: section A is constructed according to the present invention, while section B is conventional machine-made fishing netting. Fishing netting 10 extends from top ropes, as at 20, that attach the fishing netting to a vessel (not shown), that tows the fishing netting, down to a bag end 22 that collects caught fish. It can be seen that the mesh size decreases in sections from the top rope end to the bottom bag end of fishing netting 10. The apexes of the fishing netting in section A, as noted above, would be conventionally knotted, with the disadvantages attendant thereto.

Figure 2:
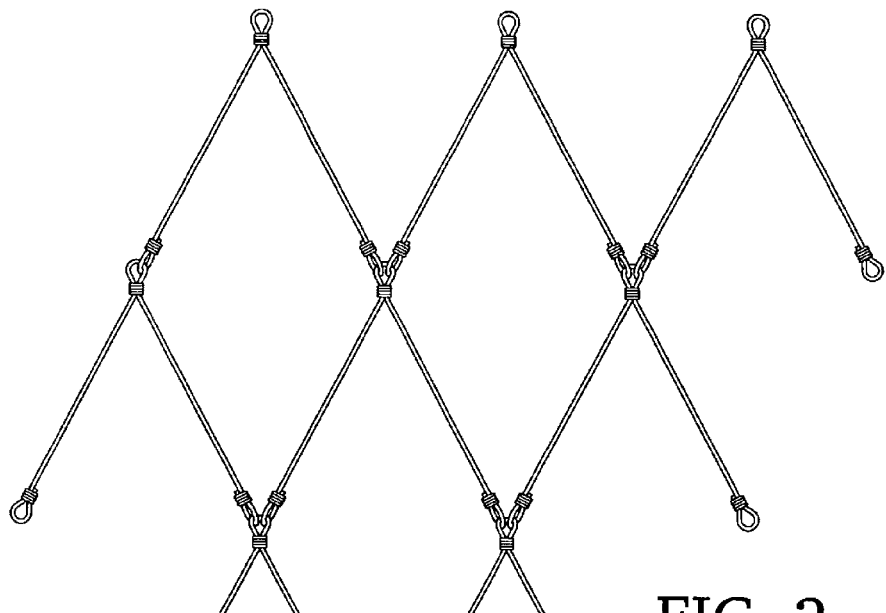
FIG. 2 is a fragmentary top plan view of a portion of fishing netting employing the present invention.
Figure 3:
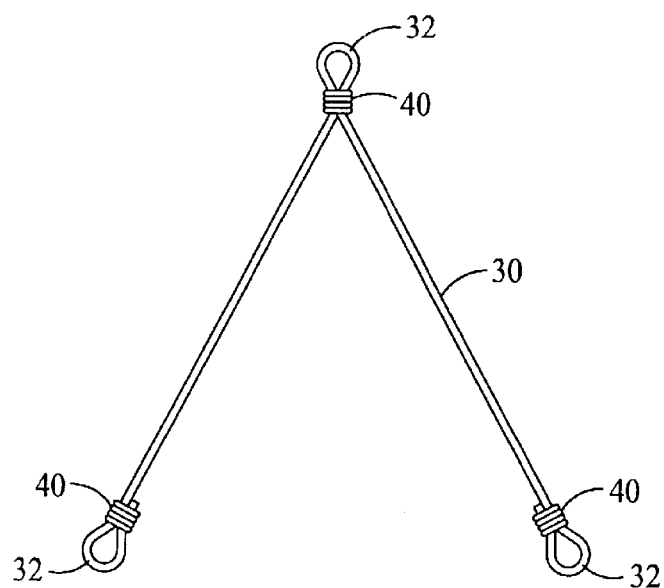
FIG. 3 is a top plan view of one strap of the fishing netting of FIG. 2.

FIG. 2 illustrates a portion of section A (FIG. 1), while FIG. 3 illustrates one of the straps used in constructing the portion.

Referring first to FIG. 3, a strap 30 is formed by cutting the required length of twine to form the sides of two meshes with an allowance in length for three loops 32, one on each end of the strap and one exactly half way from each end. Loops 32 are formed by passing two pieces of twine through each of swages 40 which are then pressed and clamped tightly to avoid slippage, insuring exact and consistent mesh sizes.

Referring now to FIG. 2, meshes are formed by interlinking the straps as shown. During formation of the meshes, the third loop of the strap is formed at the time the straps are interlinked. The process of interlinking the straps continues lengthwise and widthwise until the desired size of that section of net is achieved. For smaller or larger meshes, the strap length is changed accordingly.

Mesh sizes (measured from intersection to intersection, or one-half the length of a strap) from about 30 meters to about 1 meter can be made using the present invention. Twine sizes range from about 8 mm diameter to about 20 mm diameter, depending on the mesh size. The twine is preferably P.T. (premium twine) nylon with a braided polyethylene cover, as manufactured in Portugal. The swages used are preferably aluminum and are sized according to the twine diameter.

Advantages of the present invention over conventional fishing netting include:

No slippage, no knots, resulting in uniform mesh size.

Simple to repair by the use of pre-made straps, secured by small hammerlocks.

Because there are no knots, the fishing netting is easier to tow.

Easier to handle.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "above", "below", "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A method of manufacturing fishing netting, comprising:
   (a) cutting at least first and second desired lengths of twine to form at least first and second straps;
   (b) forming loops at ends of said at least first and second straps, each loop formed by bending an end of one of said at least first and second straps against a portion of said one of said at least first and second straps spaced apart from said end of said one of said at least first and second straps, said end being secured against said portion by means of a mechanical fastener; and
   (c) forming a third loop at a center of a third strap, said third loop being formed and secured by a mechanical fastener, and said third loop having looped therethrough a loop formed at an end of each of said first and second straps.

2. A method of manufacturing fishing netting, as defined in claim 1 further comprising: providing said mechanical fasteners as swaged fittings.

3. A method of manufacturing fishing netting, as defined in claim 2, further comprising: providing said swaged fittings formed from aluminum.

4. A method of manufacturing fishing netting, as defined in claim 1, further comprising: providing sizes of said meshes on the order of from about one meter to about thirty meters.

5. A method of manufacturing fishing netting, as defined in claim 1 further comprising: providing said meshes formed from twine having a diameter on the order of about 8 mm to about 20 mm.

* * * * *